(12) United States Patent
Keyworth et al.

(10) Patent No.: US 8,081,875 B2
(45) Date of Patent: Dec. 20, 2011

(54) WAVELENGTH SWITCH

(75) Inventors: Barrie Keyworth, Stittsville (CA); Paul Colbourne, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 986 days.

(21) Appl. No.: 12/028,031

(22) Filed: Feb. 8, 2008

(65) Prior Publication Data

US 2011/0170867 A1 Jul. 14, 2011

Related U.S. Application Data

(60) Provisional application No. 60/888,776, filed on Feb. 8, 2007.

(51) Int. Cl.
*H04J 14/00* (2006.01)

(52) U.S. Cl. .............................. 398/47; 398/48; 398/88

(58) Field of Classification Search .............. 398/47–48, 398/52, 75, 82–89, 96
See application file for complete search history.

(56) References Cited

U.S. PATENT DOCUMENTS

| | | | |
|---|---|---|---|
| 6,335,992 B1 | 1/2002 | Bala et al. | |
| 6,657,770 B2 | 12/2003 | Marom et al. | |
| 6,694,073 B2 | 2/2004 | Golub et al. | |
| 6,707,959 B2 | 3/2004 | Ducellier et al. | |
| 6,870,982 B1 | 3/2005 | Maheshwari | |
| 6,922,500 B2 | 7/2005 | Huang et al. | |
| 7,039,267 B2 | 5/2006 | Ducellier et al. | |
| 7,088,882 B2 | 8/2006 | Ducellier et al. | |
| 7,212,703 B2 | 5/2007 | Wu | |
| 2005/0117837 A1 | 6/2005 | Cerato | |
| 2006/0077552 A1* | 4/2006 | Helbing et al. | 359/566 |
| 2006/0239607 A1* | 10/2006 | Yamamoto et al. | 385/16 |
| 2006/0239608 A1* | 10/2006 | Akashi | 385/18 |
| 2006/0245685 A1* | 11/2006 | Ducellier | 385/18 |
| 2007/0242953 A1 | 10/2007 | Keyworth | |
| 2008/0316585 A1* | 12/2008 | Cohen et al. | 359/303 |

* cited by examiner

*Primary Examiner* — Dzung Tran
(74) *Attorney, Agent, or Firm* — Teitelbaum & MacLean; Neil Teitelbaum; Doug MacLean (57) ABSTRACT

The present invention relates to a wavelength switch including two switching stages. A single actuation array of reflecting elements of a first switching stage routes sub-beams at different wavelength bands to a plurality of actuation arrays of reflecting elements of a second switching stage. Each second-stage actuation array routes sub-beams to a group of output ports associated with that second-stage actuation array. Advantageously, the sub-beams are redirected from the first switching stage to the second switching stage by a reflecting relay assembly, without being combined or coupled into fibers.

25 Claims, 7 Drawing Sheets

WAVELENGTH SWITCH

CROSS-REFERENCE TO RELATED APPLICATIONS

The present invention claims priority from U.S. Provisional Patent Application No. 60/888,776 filed Feb. 8, 2007, which is incorporated herein by reference.

TECHNICAL FIELD

The present invention relates to optical switches and, in particular, to wavelength switches.

BACKGROUND OF THE INVENTION

Wavelength-division multiplexing (WDM) has enabled a dramatic increase in the transmission capacity of fiber-optic systems. WDM combines a plurality of sub-beams at different wavelength bands for propagation through an optical fiber as a multiplexed beam. As each sub-beam carries a signal, multiple signals can be transmitted simultaneously. Wavelength switches are used to route the individual sub-beams, and the signals they carry, along particular paths.

Figure 1A:
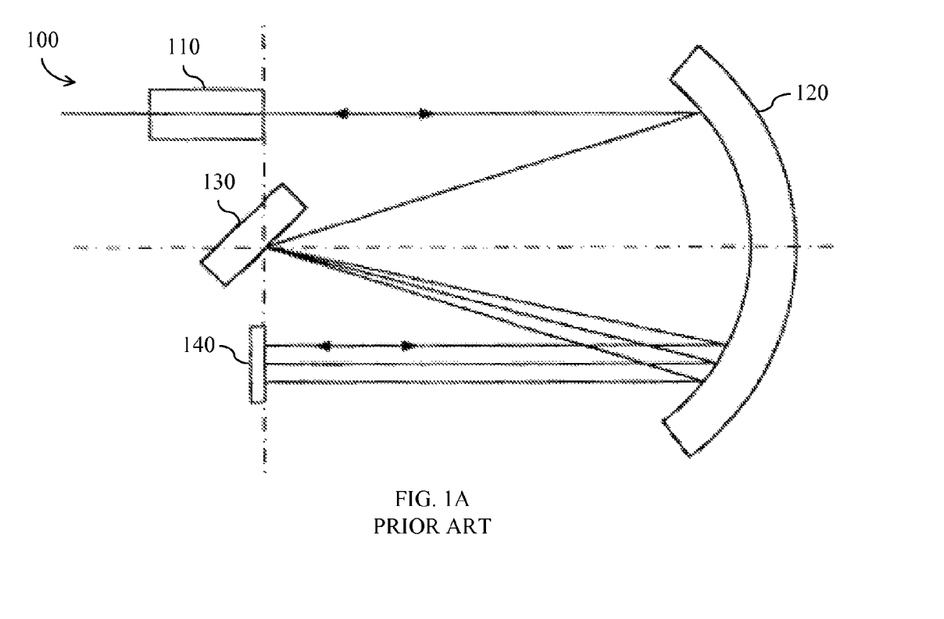
FIG. 1A is a schematic illustration of a top view of a prior-art wavelength switch.
Figure 1B:
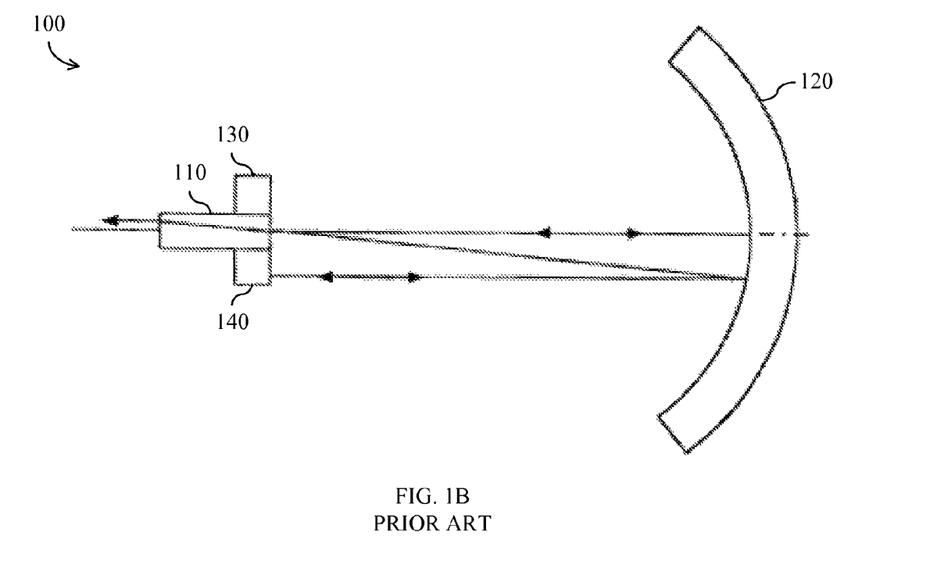
FIG. 1B is a schematic illustration of a side view of a prior-art wavelength switch.

With reference to FIGS. 1A-1B, in a prior-art wavelength switch 100 disclosed in U.S. Pat. No. 6,707,959 to Ducellier, et al., which is owned by the assignee of the present invention and is incorporated herein by reference, a multiplexed input beam is launched from an input port in a front-end unit 110 towards a lensing element 120 with optical power, for example, a spherical mirror with positive optical power. The input beam is redirected from the lensing element 120 to wavelength-dispersing element 130, for example, a reflecting diffraction grating, which disperses the input beam into a plurality of sub-beams at different wavelength bands. The sub-beams are then redirected from the wavelength-dispersing element 130, via the lensing element 120, to a switching stage in a back-end unit 140. The switching stage includes an actuation array of reflecting elements, for example, a microelectromechanical system (MEMS) mirror array, which routes each sub-beam to a selected one of a plurality of output ports in the front-end unit 110. Each sub-beam is associated with a reflecting element of the actuation array, and the associated reflecting element can be tilted about an axis to route the sub-beam along a path leading to the selected output port. The sub-beams are redirected from the switching stage in the back-end unit 140, via the lensing element 120, back to the wavelength-dispersing element 130, which combines those sub-beams that are routed to a same output port. The sub-beams are then redirected from the wavelength-dispersing element 130, via the lensing element 120, to the selected output ports in the front-end unit 110, which output the sub-beams.

In such a wavelength switch including a single actuation array of reflecting elements of a single switching stage, the number of output ports is limited by the angular range through which the individual reflecting elements of the actuation array can be tilted. Currently, the maximum number of output ports is about 11. However, to demultiplex a larger number of signals, a larger number of output ports is desired.

Figure 2:
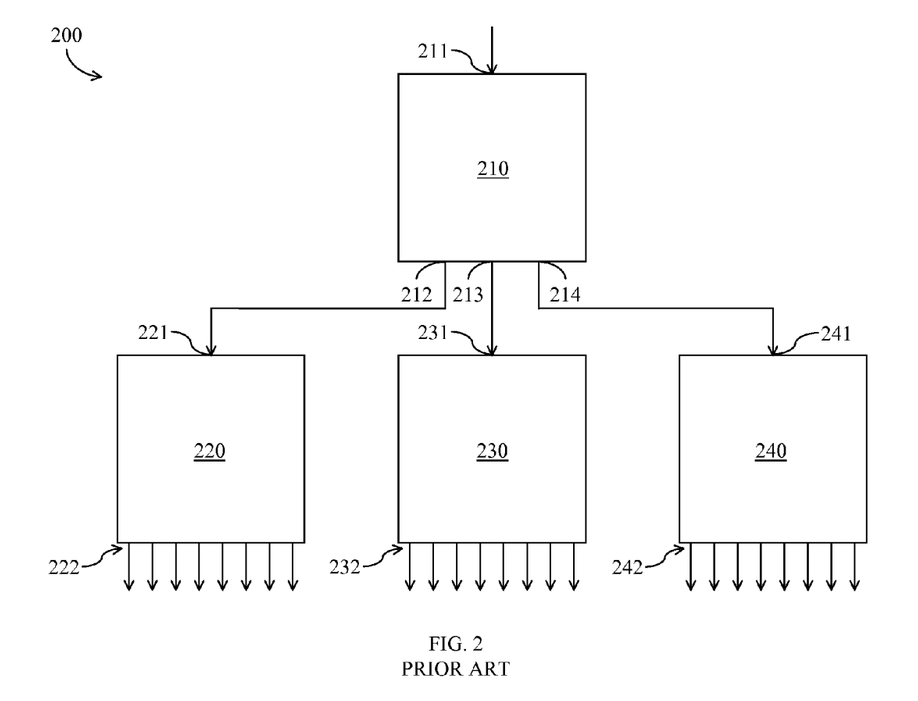
FIG. 2 is a block diagram of a prior-art switching cascade.

One approach to achieving a larger number of output ports involves combining several wavelength switches, each of which includes a single actuation array of reflecting elements, to form a switching cascade, as disclosed in U.S. Pat. No. 6,657,770 to Marom, et al., for example. The output ports of one wavelength switch of a first switching stage are coupled to the input ports of a plurality of wavelength switches of a second switching stage. The maximum number of output ports is, thereby, squared. With reference to FIG. 2, the combination of one 1×3 wavelength switch 210, which has one input port 211 and three output ports 212-214, with three 1×8 wavelength switches 220, 230, and 240, which each have one input port 221, 231, and 241 and eight output ports 222, 232, and 242, forms a 1×24 switching cascade 200.

However, in this approach, sub-beams output from the wavelength switch of the first switching stage must be coupled back into fibers before being launched into the plurality of wavelength switches of the second switching stage, which entails high insertion losses. Thus, a wavelength switch incorporating two switching stages, a first switching stage including a single actuation array of reflecting elements and a second switching stage including a plurality of actuation arrays of reflecting elements, in a single device is desired.

Wavelength cross-connects including two switching stages in a single device are disclosed in U.S. Pat. No. 6,694,073 to Golub, et al., U.S. Pat. No. 6,870,982 to Maheshwari, U.S. Pat. No. 6,922,500 to Huang, et al., U.S. Pat. No. 7,088,882 to Ducellier, et al., and U.S. Patent Application No. 2005/0117837 to Cerato, for example. In such wavelength cross-connects, an actuation array of reflecting elements of a first switching stage routes sub-beams to a plurality of actuation arrays of reflecting elements of a second switching stage. However, each second-stage actuation array routes sub-beams to a single output port associated with that actuation array. Thus, the disclosed wavelength cross-connects do not fulfill the goal of achieving a larger number of output ports in a single device.

An object of the present invention is to overcome the shortcomings of the prior art by providing a wavelength switch including two switching stages. A single actuation array of reflecting elements of a first switching stage routes sub-beams to a plurality of actuation arrays of reflecting elements of a second switching stage. Each second-stage actuation array routes sub-beams to a group of output ports associated with that second-stage actuation array. The sub-beams are redirected from the first switching stage to the second switching stage by a reflecting relay assembly, without being combined or coupled into fibers, allowing the number of output ports to be increased, without incurring additional insertion losses.

SUMMARY OF THE INVENTION

Accordingly, the present invention relates to a wavelength switch comprising: an input port for launching an input beam including first and second groups of sub-beams, wherein each sub-beam of the first and second groups of sub-beams is at a different wavelength band; first and second groups of output ports for outputting the first and second groups of sub-beams, respectively; a lensing element with optical power, disposed to receive the input beam from the input port, for redirecting the input beam and the first and second groups of sub-beams; a wavelength-dispersing element, disposed to receive the input beam from the lensing element, for dispersing the input beam into the first and second groups of sub-beams; a first switching stage including a first actuation array of reflecting elements, disposed to receive the first and second groups of sub-beams from the wavelength-dispersing element via the lensing element, for routing the first group of sub-beams along a first set of paths and the second group of sub-beams along a second set of paths; a reflecting relay assembly, disposed to receive the first and second groups of sub-beams from the first switching stage via the lensing element, for redirecting the first group of sub-beams along the first set of paths and the second group of sub-beams along the second set of paths; and a second switching stage including: a second actuation array of reflecting elements, disposed to receive only the first group of sub-beams from the reflecting relay assembly, for routing each sub-beam of the first group of sub-beams to a selected output port of the first group of output ports; and a third actuation array of reflecting elements, disposed to receive only the second group of sub-beams from the reflecting relay assembly, for routing each sub-beam of the second group of sub-beams to a selected output port of the second group of output ports; wherein the wavelength-dispersing element is also disposed to receive the first and second groups of sub-beams from the second switching stage via the lensing element, whereby the wavelength-dispersing element combines those sub-beams of the first group of sub-beams that are routed to a same output port of the first group of output ports and those sub-beams of the second group of sub-beams that are routed to a same output port of the second group of output ports; wherein the first group of output ports is disposed to receive only the first group of sub-beams from the wavelength-dispersing element via the lensing element; and wherein the second group of output ports is disposed to receive only the second group of sub-beams from the wavelength-dispersing element via the lensing element.

Another aspect of the present invention relates to a wavelength-switching method comprising: launching an input beam including first and second groups of sub-beams from an input port towards a lensing element with optical power, wherein each sub-beam of the first and second groups of sub-beams is at a different wavelength band; redirecting the input beam from the lensing element to a wavelength-dispersing element; dispersing the input beam into the first and second groups of sub-beams; redirecting the first and second groups of sub-beams from the wavelength-dispersing element to a first actuation array of reflecting elements of a first switching stage via the lensing element; routing the first group of sub-beams along a first set of paths to a second actuation array of reflecting elements of a second switching stage; routing the second group of sub-beams along a second set of paths to a third actuation array of reflecting elements of the second switching stage; redirecting the first and second groups of sub-beams from the first switching stage to a reflecting relay assembly via the lensing element; redirecting only the first group of sub-beams along the first set of paths from the reflecting relay assembly to the second actuation array of reflecting elements of the second switching stage via the lensing element; redirecting only the second group of sub-beams along the second set of paths from the reflecting relay assembly to the third actuation array of reflecting elements of the second switching stage via the lensing element; routing each sub-beam of the first group of sub-beams to a selected output port of a first group of output ports; routing each sub-beam of the second group of sub-beams to a selected output port of a second group of output ports; redirecting the first and second groups of sub-beams from the second switching stage to the wavelength-dispersing element via the lensing element; combining those sub-beams of the first group of sub-beams that are routed to a same output port of the first group of output ports; combining those sub-beams of the second group of sub-beams that are routed to a same output port of the second group of output ports; redirecting only the first group of sub-beams from the wavelength-dispersing element to the first group of output ports via the lensing element; redirecting only the second group of sub-beams from the wavelength-dispersing element to the second group of output ports via the lensing element; and outputting the first and second groups of sub-beams from the first and second groups of output ports, respectively.

Another aspect of the present invention relates to a wavelength switch comprising: first and second groups of input ports for launching first and second groups of sub-beams, respectively, wherein each sub-beam of the first and second groups of sub-beams is at a different wavelength band; an output port for outputting an output beam including the first and second groups of sub-beams; a lensing element with optical power, disposed to receive only the first group of sub-beams from the first group of input ports and only the second group of sub-beams from the second group of input ports, for redirecting the first and second groups of sub-beams and the output beam; a wavelength-dispersing element, disposed to receive the first and second groups of sub-beams from the lensing element, for dispersing those sub-beams of the first group of sub-beams that are received from a same input port of the first group of input ports via the lensing element and those sub-beams of the second group of sub-beams that are received from a same input port of the second group of input ports via the lensing element; a first switching stage including: a first actuation array of reflecting elements, disposed to receive only the first group of sub-beams from the wavelength-dispersing element via the lensing element, for routing the first group of sub-beams along a first set of paths; and a second actuation array of reflecting elements, disposed to receive only the second group of sub-beams from the wavelength-dispersing element via the lensing element, for routing the second group of sub-beams along a second set of paths; a reflecting relay assembly, disposed to receive the first and second groups of sub-beams from the first switching stage via the lensing element, for redirecting the first group of sub-beams along the first set of paths and the second group of sub-beams along the second set of paths; and a second switching stage including a third actuation array of reflecting elements, disposed to receive the first and second groups of sub-beams from the reflecting relay assembly, for routing each sub-beam of the first and second groups of sub-beams to the output port; wherein the wavelength-dispersing element is also disposed to receive the first and second groups of sub-beams from the second switching stage via the lensing element, whereby the wavelength-dispersing element combines the first and second groups of sub-beams into the output beam; and wherein the output port is disposed to receive the output beam from the wavelength-dispersing element via the lensing element.

Another aspect of the present invention relates to a wavelength-switching method comprising: launching first and second groups of sub-beams from first and second groups of input ports, respectively, towards a lensing element with optical power, wherein each sub-beam of the first and second groups of sub-beams is at a different wavelength band; redirecting the first and second groups of sub-beams from the lensing element to a wavelength-dispersing element; dispersing those sub-beams of the first group of sub-beams that are received from a same input port of the first group of input ports via the lensing element and those sub-beams of the second group of sub-beams that are received from a same input port of the second group of input ports via the lensing element; redirecting only the first group of sub-beams from the wavelength-dispersing element to a first actuation array of reflecting elements of a first switching stage via the lensing element; redirecting only the second group of sub-beams from the wavelength-dispersing element to a second actuation array of reflecting elements of the first switching stage via the lensing element; routing the first group of sub-beams along a first set of paths to a third actuation array of reflecting elements of a second switching stage; routing the second group of sub-beams along a second set of paths to the third actuation array of reflecting elements of the second switching stage; redirecting the first and second groups of sub-beams from the first switching stage to a reflecting relay assembly via the lensing element; redirecting only the first group of sub-beams along the first set of paths from the reflecting relay assembly to the third actuation array of reflecting elements of the second switching stage via the lensing element; redirecting only the second group of sub-beams along the second set of paths from the reflecting relay assembly to the third actuation array of reflecting elements of the second switching stage via the lensing element; routing each sub-beam of the first and second groups of sub-beams to a same output port; redirecting the first and second groups of sub-beams from the second switching stage to the wavelength-dispersing element via the lensing element; combining the first and second groups of sub-beams into an output beam; redirecting the output beam from the wavelength-dispersing element to the output port via the lensing element; and outputting the output beam from the output port.

BRIEF DESCRIPTION OF THE DRAWINGS

The invention will be described in greater detail with reference to the accompanying drawings, some of which represent preferred, exemplary embodiments thereof, wherein.

DETAILED DESCRIPTION

With reference to FIGS. 3A-3E, the present invention provides a wavelength switch 300 including a front-end unit 310, a wavelength-dispersing element 330, a back-end unit 340, and a lensing element 320 with optical power. The arrangement of these components in the wavelength switch 300 of the present invention is similar to that in the prior-art wavelength switch 100 illustrated in FIGS. 1A-1B. In addition, the wavelength switch 300 of the present invention includes a reflecting relay assembly.

For simplicity, the wavelength switch 300 will be described in detail in the context of its operation as a demultiplexer acting on a multiplexed input beam including two groups of sub-beams, each sub-beam of which is at a different wavelength band. The input beam may, of course, include more than two groups of sub-beams.

In operation as a demultiplexer, the input beam including first and second groups of sub-beams is launched from an input port 301 located in the front-end unit 310 of the wavelength switch 300. Preferably, the front-end unit 310 also includes an input switching lens 311 with positive optical power, disposed to receive the input beam from the input port 301, for collimating the input beam. Preferably, the input port 301 is located at a focal plane of the input switching lens 311.

In some instances, the input switching lens 311 is a spherical lens with positive optical power. In the illustrated embodiment, the input switching lens 311 is a horizontal cylindrical lens with positive optical power. The front-end unit 310 of the illustrated embodiment also includes a conditioning lens 315, which is, preferably, a vertical cylindrical lens with positive optical power. In combination, the input switching lens 311 and the conditioning lens 315 condition the input beam to have an elliptical cross-section, such that the input beam is small in waist size in the horizontal direction, which is perpendicular to the page in FIG. 3B, but large in waist size in the vertical direction, which is parallel to the page in FIG. 3B.

Figure 3A:
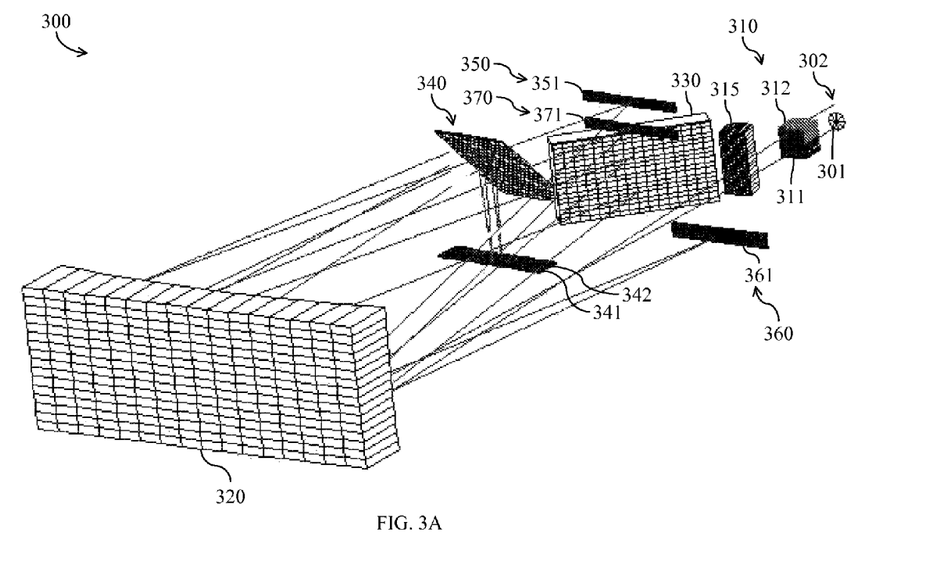
FIG. 3A is a schematic illustration of a perspective view of a wavelength switch according to the present invention.
Figure 3B:
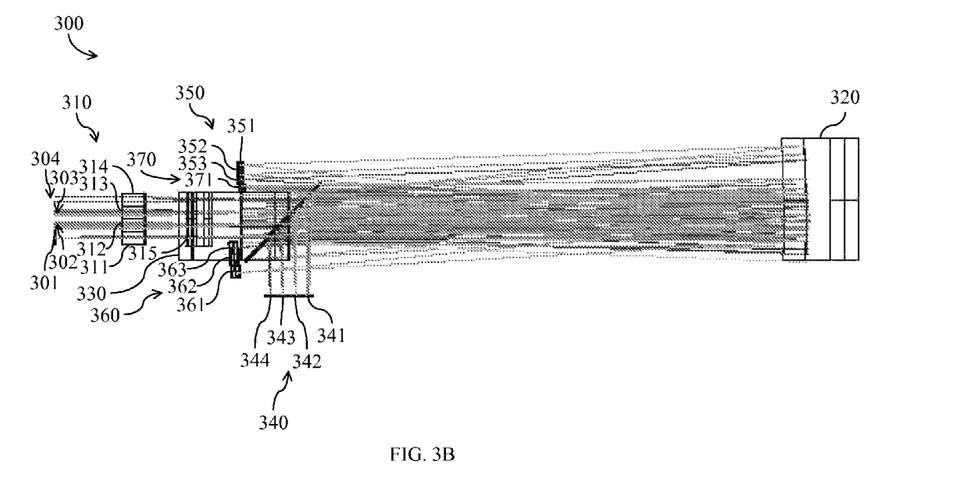
FIG. 3B is a schematic illustration of a side view of the wavelength switch of FIG. 3A.
Figure 3C:
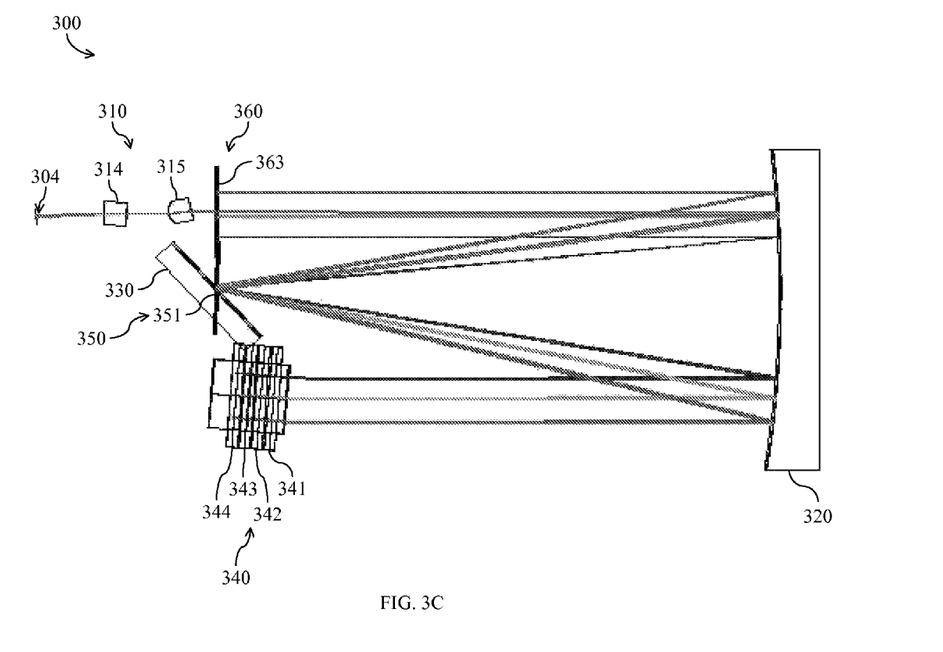
FIG. 3C is a schematic illustration of a top view of the wavelength switch of FIGS. 3A-3B.
Figure 3D:
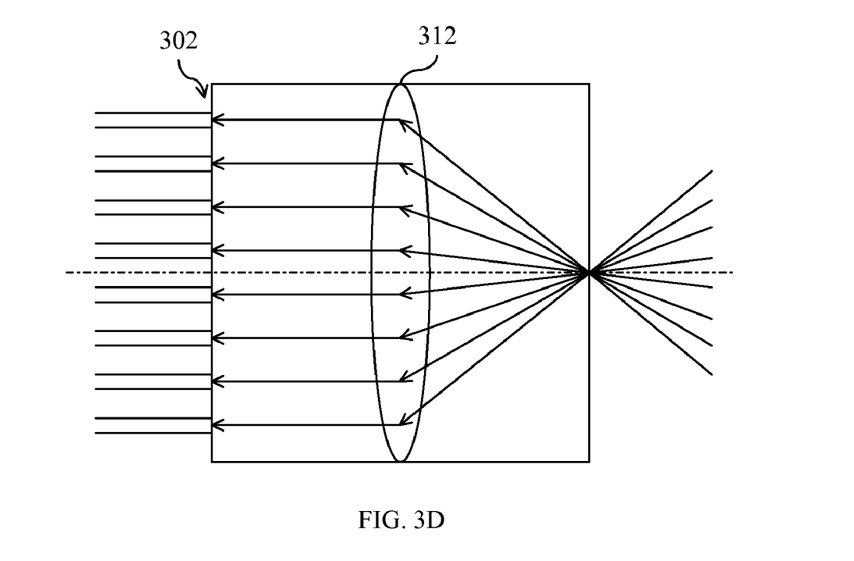
FIG. 3D is a schematic illustration of a group of output ports and an output switching lens in the wavelength switch of FIGS. 3A-3C.

The front-end unit 310 also includes groups of output ports 302-304. In the illustrated embodiment, the front-end unit 310 includes three groups of eight output ports 302-304. A first group of output ports 302 outputs the first group of sub-beams, and a second group of output ports 303 outputs the second group of sub-beams. Preferably, the front-end unit 310 also includes output switching lenses 312-314 associated with the groups of output ports 302-304. A first output switching lens 312 is associated with the first group of output ports 302, and a second output switching lens 313 is associated with the second group of output ports 303. For clarity, only one group of output ports 302 and one output switching lens 312 are illustrated in FIG. 3A. Only one group of output ports 304 and one output switching lens 314 are visible in the top view illustrated in FIG. 3C. A more detailed view of a group of output ports 302 and its associated output switching lens 312 is illustrated in FIG. 3D, in which the conditioning lens 315 is omitted, for clarity. As for the input switching lens 311, the output switching lenses 312-314 are, preferably, spherical or horizontal cylindrical lenses with positive optical power. Preferably, the groups of output ports 302-304 are located at focal planes of their associated output switching lenses 312-314.

Figure 4:
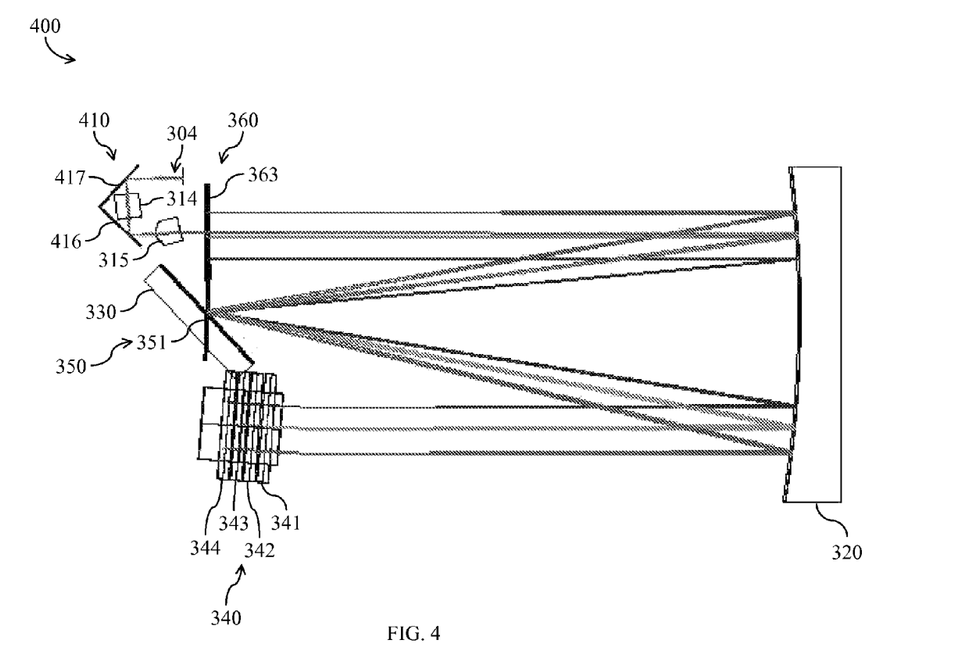
FIG. 4 is a schematic illustration of a top view of a wavelength switch according to the present invention.

With reference to FIG. 4, an alternative embodiment of a wavelength switch 400 includes fold mirrors 416-417 to provide a more compact front-end unit 410. In such an embodiment, the input switching lens 311 and the output switching lenses 312-314 are positioned between the fold mirrors 416-417 in the front-end unit 410. Only one output switching lens 314 is visible in the top view illustrated in FIG. 4.

With reference again to FIGS. 3A-3E, the input beam is received from the input port 301 by the lensing element 320, in some instances, via the input switching lens 311. In the illustrated embodiment, the lensing element 320 is a spherical mirror with positive optical power. In such an embodiment, the front-end unit 310, a wavelength-dispersing element 330, and a back-end unit 340 are, preferably, disposed at a same focal plane of the spherical mirror 320. However, other arrangements are within the scope of the present invention. For example, an alternative embodiment includes a spherical lens with positive optical power as the lensing element 320. In such an embodiment, the front-end unit 310 and the back-end unit 340 are, preferably, disposed at a same focal plane of the spherical lens, and the wavelength-dispersing element 330 at an opposite focal plane.

The input beam is redirected from the lensing element 320 to the wavelength-dispersing element 330, which disperses the input beam into the first and second groups of sub-beams. In the illustrated embodiment, the wavelength-dispersing element 330 is a reflecting diffraction grating, with ruled lines or holographically generated lines. Preferably, the reflecting diffraction grating has a blazed or a sinusoidal profile to maximize the diffraction efficiency of one diffraction order. Alternatively, the wavelength-dispersing element 330 may include a transmitting diffraction grating and a mirror, disposed behind the transmitting diffraction grating. The mirror receives the first and second groups of sub-beams from the transmitting diffraction grating and redirects the first and second groups of sub-beams back to the transmitting diffraction grating. Advantageously, such an arrangement provides a wavelength-dispersing element 330 with increased wavelength-dispersing power.

The first and second groups of sub-beams are redirected from the wavelength-dispersing element 330, via the lensing element 320, to a first switching stage 345 located in the back-end unit 340. The first switching stage 345 includes a first actuation array 341 of reflecting elements for routing the first group of sub-beams along a first set of paths and the second group of sub-beams along a second set of paths. Each sub-beam of the first and second groups of sub-beams is associated with a reflecting element of the first actuation array 341, as indicated by the labels $\lambda_1$-$\lambda_8$ in FIG. 3E, and the associated reflecting element can be tilted about an axis, which is perpendicular to the page in FIG. 3B and is illustrated as a dashed-dotted line in FIG. 3E, to route the sub-beam. The first actuation array 341, thereby, routes each sub-beam to a selected one of a plurality of actuation arrays 342-344 of reflecting elements of a second switching stage 346. The first group of sub-beams is routed along a first set of paths to a second actuation array 342 of reflecting elements of the second switching stage 346, and the second group of sub-beams is routed along a second set of paths to a third actuation array 343 of reflecting elements of the second switching stage 346.

The first and second groups of sub-beams are redirected from the first switching stage 345, via the lensing element 320, to the reflecting relay assembly. The reflecting relay assembly redirects the first group of sub-beams along the first set of paths to the second actuation array 342 and redirects the second group of sub-beams along the second set of paths to the third actuation array 343.

Preferably, the reflecting relay assembly includes a first reflecting stage 350, a second reflecting stage 360, and a third reflecting stage 370. The first group of sub-beams is redirected along the first set of paths from the first actuation array 341, via the lensing element 320, to the first reflecting stage 350, from the first reflecting stage 350, via the lensing element 320, to the second reflecting stage 360, from the second reflecting stage 360, via the lensing element 320, to the third reflecting stage 370, and from the third reflecting stage 370, via the lensing element, to the second actuation array 342. The second group of sub-beams is redirected along the second set of paths from the first actuation array 341, via the lensing element 320, to the first reflecting stage 350, from the first reflecting stage 350, via the lensing element 320, to the second reflecting stage 360, from the second reflecting stage 360, via the lensing element 320, to the third reflecting stage 370, and from the third reflecting stage 370, via the lensing element, to the third actuation array 343.

The first reflecting stage 350 and the third reflecting stage 370 are, preferably, disposed near the wavelength-dispersing element 330, on one side of a plane including the front-end unit 310, the back-end unit 340, the wavelength-dispersing element 330, and the lensing element 320. The second reflecting stage 360 is, preferably, disposed near the front-end unit 310, on an opposite side of said plane.

In the illustrated embodiment, the first reflecting stage 350 includes three planar mirrors 351-353, each of which lies on a set of paths to one of the three actuation arrays 342-344 of the second switching stage 346. A first planar mirror 351 lies on the first set of paths to the second actuation array 342, and a second planar mirror 352, disposed non-parallel to the first planar mirror 351, lies on the second set of paths to the third actuation array 343. For clarity, only one first-stage planar mirror 351 is illustrated in FIG. 3A. Only one first-stage planar mirror 351 is visible in the top view illustrated in FIG. 3C. Preferably, the first planar mirror 351 and the second planar mirror 352 are separated by a distance allowing hitless switching. Accordingly, the distance between the first planar mirror 351 and the second planar mirror 352 is, preferably, at least three times a waist radius of the first and second groups of sub-beams. Thus, when the routing of a particular sub-beam is to be changed, the sub-beam can be directed to a position between the first planar mirror 351 and the second planar mirror 352.

Likewise, the second reflecting stage 360 also includes three planar mirrors 361-363, each of which lies on a set of paths to one of the three actuation arrays 342-344 of the second switching stage 346. A third planar mirror 361 lies on the first set of paths to the second actuation array 342, and a fourth planar mirror 362, disposed non-parallel to the third planar mirror 361, lies on the second set of paths to the third actuation array 343. For clarity, only one second-stage planar mirror 361 is illustrated in FIG. 3A. Only one second-stage planar mirror 363 is visible in the top view illustrated in FIG. 3C.

The third reflecting stage 370 includes a single fifth planar mirror 371, which lies on all paths to all the second-stage actuation arrays 342-344. The third reflecting stage 370 is not visible in the top view illustrated in FIG. 3C.

Thus, in the illustrated embodiment, the first group of sub-beams is redirected along the first set of paths from the first actuation array 341, via the lensing element 320, to the first planar mirror 351, from the first planar mirror 351, via the lensing element 320, to the third planar mirror 361, from the third planar mirror 361, via the lensing element 320, to the fifth planar mirror 371, and from the fifth planar mirror 371, via the lensing element 320, to the second actuation array 342. The second group of sub-beams is redirected along the second set of paths from the first actuation array 341, via the lensing element 320, to the second planar mirror 352, from the second planar mirror 352, via the lensing element 320, to the fourth planar mirror 362, from the fourth planar mirror 362, via the lensing element 320, to the fifth planar mirror 371, and from the fifth planar mirror 371, via the lensing element 320, to the third actuation array 343.

The first and second groups of sub-beams are, thereby, redirected from the reflecting relay assembly, via the lensing element 320, to the second switching stage 346 in the back-end unit 340. In the illustrated embodiment, the second switching stage 346 includes three actuation arrays 342-344 of reflecting elements, which are associated with the three groups of output ports 302-304. A second actuation array 342 of reflecting elements routes the first group of sub-beams, and a third actuation array 343 of reflecting elements routes the second group of sub-beams. For clarity, only one second-stage actuation array 342 is illustrated in FIG. 3A. Each sub-beam of the first and second groups of sub-beams is associated with a reflecting element in each of the second-stage actuation arrays 342-344, as indicated by the labels $\lambda_1$-$\lambda_8$ in FIG. 3E, and the associated reflecting elements can be tilted about an axis, which is perpendicular to the page in FIG. 3B and is illustrated as a dashed-dotted line in FIG. 3E, to route the sub-beam. Each second-stage actuation array 342-344, thereby, routes sub-beams to a selected one of a group of output ports 302-304 associated with that second-stage actuation array 342-344. The second actuation array 342 routes each sub-beam of the first group of sub-beams to a selected one of the first group of output ports 302, and the third actuation array 343 routes each sub-beam of the second group of sub-beams to a selected one of the second group of output ports 303.

Figure 3E:
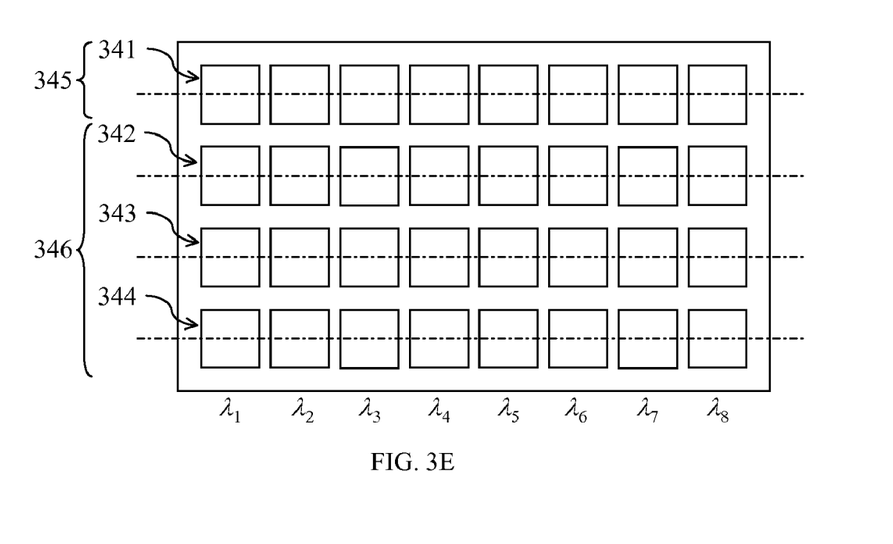
FIG. 3E is a schematic illustration of first and second switching stages in the wavelength switch of FIGS. 3A-3C.

As illustrated in FIG. 3E, the first-stage actuation array 341 and the second-stage actuation arrays 342-344 are, preferably, disposed on a single substrate. In the illustrated embodiment, the first-stage actuation array 341 and the second-stage actuation arrays 342-344 are microelectromechanical system (MEMS) mirror arrays disposed as rows on the substrate. In an alternative embodiment, the first-stage actuation array 341 and the second-stage actuation arrays 342-344 are liquid crystal on silicon (LCOS) arrays. Individual reflecting elements of the first-stage actuation array 341 and the second-stage actuation arrays 342-344 can be tilted about at least one axis through an angular range of about 2° in response to a control signal provided on a control line. Advantageously, because each sub-beam is incident on only one reflecting element of a second-stage actuation array 342-344, the second-stage actuation arrays 342-344 can share common control lines, reducing the electrical pinout.

Preferably, the second-stage actuation arrays 342-344 are separated by a distance allowing hitless switching. Accordingly, the distance between the second actuation array 342 and the third actuation array 343 is, preferably, at least three times a waist radius of the first and second groups of sub-beams. Thus, when the routing of a particular sub-beam is to be changed, the sub-beam can be directed to a position between the second-stage actuation arrays 342-344.

The first and second groups of sub-beams are redirected from the second switching stage 346, via the lensing element 320, back to the wavelength-dispersing element 330, which combines those sub-beams routed to a same output port 302-304. Thus, the wavelength-dispersing element 330 combines those sub-beams of the first group of sub-beams that are routed to a same output port of the first group of output ports 302 and those sub-beams of the second group of sub-beams that are routed to a same output port of the second group of output ports 303.

The first group of sub-beams is then redirected from the wavelength-dispersing element 330, via the lensing element 320, to the first group of output ports 302 in the front-end unit 310, and the second group of sub-beams is redirected from the wavelength-dispersing element 330, via the lensing element 320, to the second group of output ports 303 in the front-end unit 310. As mentioned heretofore, a first output switching lens 312 is, preferably, disposed before the first group of output ports 302, and a second output switching lens 313 is, preferably, disposed before the second group of output ports 303. Each output switching lens 312-314 converts angular offsets imparted to a group of sub-beams by reflecting elements of a second-stage actuation array 342-344 into positional offsets corresponding to locations of output ports of its associated group of output ports 302-304. Advantageously, each output switching lens 312-314 allows a single reflecting element of its associated second-stage array 342-344 to route the sub-beam associated with that reflecting element to a group of output ports 302-304.

Figure 5A:
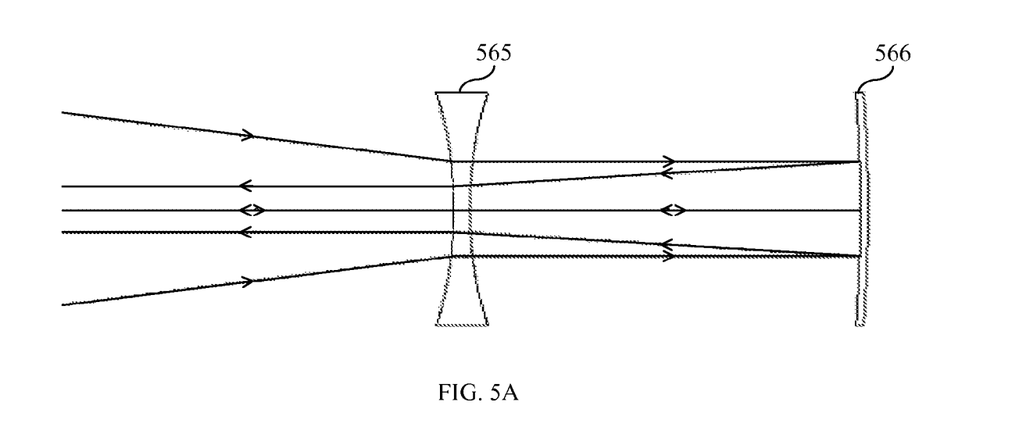
FIG. 5A is a schematic illustration of a reflecting angle-to-offset (ATO) assembly in a wavelength switch according to the present invention.
Figure 5B:
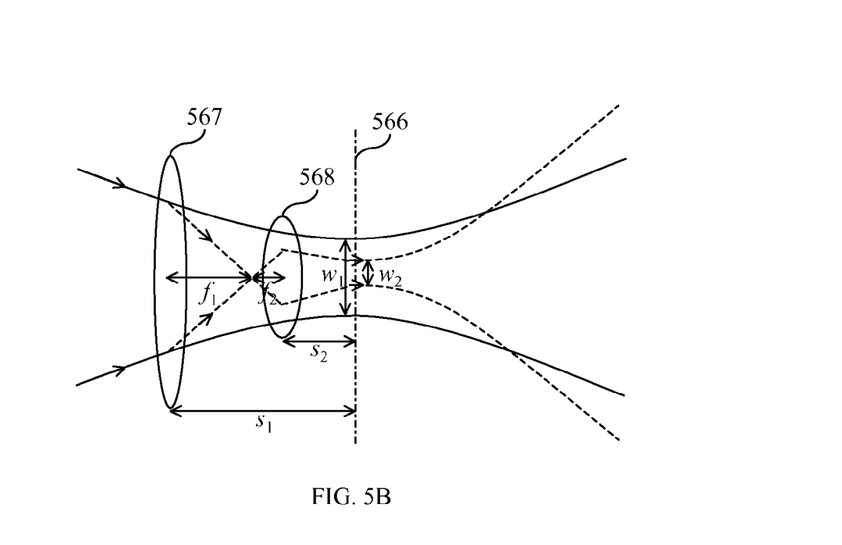
FIG. 5B is a schematic illustration of a beam-reducing assembly in a wavelength switch according to the present invention.

With reference to FIGS. 5A-5B, another embodiment of a wavelength switch includes an alternative reflecting relay assembly. In such an embodiment, the placement of the first reflecting stage 350, the second reflecting stage 360, and the third reflecting stage 370 relative to the front-end unit 310, the back-end unit 340, the wavelength-dispersing element 330, and the lensing element 320 is as described heretofore and as illustrated in FIGS. 3A-3C. However, the first reflecting stage 350 includes a single first planar mirror, the second reflecting stage 360 includes a reflecting angle-to-offset (ATO) assembly, and the third reflecting stage 370 includes a single second planar mirror. The first planar mirror, reflecting ATO assembly, and second planar mirror lie on all paths to all the second-stage actuation arrays 342-344.

Thus, in such an embodiment, the first group of sub-beams is redirected along a first set of paths from the first actuation array 341, via the lensing element 320, to the first planar mirror, from the first planar mirror, via the lensing element 320, to the reflecting ATO assembly, from the reflecting ATO assembly, via the lensing element 320, to the second planar mirror, and from the second planar mirror, via the lensing element 320, to the second actuation array 342. The second group of sub-beams is redirected along a second set of paths from the first actuation array 341, via the lensing element 320, to the first planar mirror, from the first planar mirror, via the lensing element 320, to the reflecting ATO assembly, from the reflecting ATO assembly, via the lensing element 320, to the second planar mirror, and from the second planar mirror, via the lensing element 320, to the third actuation array 343.

The reflecting ATO assembly of such an embodiment converts angular offsets of the first and second groups of sub-beams into positional offsets. Accordingly, tilt angles imparted to sub-beams by reflecting elements of the first-stage actuation array 341 are converted into positional offsets on a second-stage actuation array 342-344. Therefore, advantageously, the tilt-angle tolerances of the reflecting elements of the first-stage actuation array 341 and those of the reflecting elements of the second-stage actuation arrays 342-344 do not add linearly, improving the precision with which sub-beams can be routed.

Furthermore, such an embodiment allows the first actuation array 341 to be used for attenuation, as well as for switching. When a particular sub-beam is to be attenuated, the reflecting element of the first actuation array 341 associated with that sub-beam is tilted such that the sub-beam is routed to a position offset from the center of a reflecting element of a second-stage actuation array 342-344 associated with that sub-beam, resulting in a coupling loss. Similarly, hitless switching can also be achieved in such an embodiment. When the routing of a particular sub-beam is to changed, the reflecting element of the first actuation array 341 associated with that sub-beam is tilted, such that the sub-beam is directed to a position between second-stage actuation arrays 342-344, while the tilt angle of a reflecting element of a second-stage actuation array 342-346 associated with that sub-beam is changed.

The reflecting ATO assembly, preferably, includes a first ATO lens 565 with negative optical power and an ATO mirror 566. In the illustrated embodiment, the ATO mirror 566 has positive optical power, and the optical power of the first ATO lens 565 is twice as large in magnitude as the optical power of the ATO mirror 566. The first ATO lens 565 and the ATO mirror are separated by a distance substantially equivalent to the negative of a focal length of the first ATO lens 565.

Preferably, the first ATO lens is a horizontal cylindrical lens with negative optical power, and the ATO mirror is a horizontal cylindrical mirror with positive optical power. In an alternative embodiment, the ATO mirror 566 is planar, and the first ATO lens 565 and the ATO mirror 566 are separated by a distance substantially equivalent to a focal length of the first ATO lens divided by $-\sqrt{2}$.

When converging sub-beams enter such a reflecting ATO assembly, they are redirected and exit as parallel sub-beams. Angular offsets of the sub-beams are, thereby, converted into positional offsets. Advantageously, waists of Gaussian sub-beams entering and exiting the reflecting ATO assembly are located at a substantially same position, the location of the ATO mirror 566, in both vertical and horizontal directions.

Preferably, the separation between the first ATO lens 565 and the ATO mirror 566 is substantially equivalent to twice a Rayleigh range of the first and second groups of sub-beams to ensure that entering and exiting sub-beams have a substantially same waist size. Advantageously, this condition allows the sizes and angular ranges of the reflecting elements of the first-stage actuation array 341 and of the second-stage actuation arrays 342-344 to be substantially the same, facilitating their fabrication on a single substrate.

If the required separation between the first ATO lens 565 and the ATO mirror 566 is impractically large, for example, larger than a focal length of the lensing element 320, a beam-reducing system can be included in the reflecting ATO assembly to reduce the first and second groups of sub-beams in waist size and, hence, to reduce the Rayleigh range of the first and second groups of sub-beams. Such a beam-reducing assembly includes at least a second ATO lens 567 with positive optical power, disposed before the first ATO lens 565. Preferably, the one or more additional ATO lenses 567-568 are horizontal cylindrical lenses with positive optical power.

In the illustrated embodiment, the beam-reducing assembly includes a third ATO lens 568 with positive optical power, in addition to the second ATO lens 567. A ratio of a separation between the second ATO lens 567 and the ATO mirror 566, $s_1$, and a separation between the third ATO lens 568 and the ATO mirror 566, $s_2$, is substantially equivalent to a ratio of a focal length of the second ATO lens 567, $f_1$, to a focal length of the third ATO lens 568, $f_2$, that is:

$$\frac{s_1}{s_2} = \frac{f_1}{f_2}. \qquad (1)$$

Furthermore, the second ATO lens 567 and the third ATO lens 568 are separated by a distance substantially equivalent to a sum of the focal length of the second ATO lens 567 and the focal length of the third ATO lens 568, such that:

$$s_1 - s_2 = f_1 + f_2. \qquad (2)$$

Consequently, a waist size of the first and second groups of sub-beams at the ATO mirror 566 is reduced from $w_1$ to $w_2$, according to:

$$w_2 = w_1 \left(\frac{f_2}{f_1}\right). \qquad (3)$$

Of course, other combinations of three or more lensing and reflecting elements could also provide the function of the reflecting ATO assembly within the space available.

Those skilled in the art will appreciate that wavelength switches 300 and 400, in any of the embodiments described heretofore, can also be used in reverse as multiplexers acting on two groups of sub-beams, each sub-beam of which is at a different wavelength band, as outlined in brief in the following.

With reference again to FIGS. 3A-3E, in operation as a multiplexer, first and second groups of sub-beams are launched from a first group of input ports 302 and a second group of input ports 303, respectively, heretofore referred to as the first group of output ports and the second group of output ports. The first and second groups of sub-beams are received by the lensing element 320 with optical power, in some instances, via input switching lenses 312-313, heretofore referred to as output switching lenses. The first and second groups of sub-beams are then redirected from the lensing element 320 to the wavelength-dispersing element 330, which disperses those sub-beams of the first group of sub-beams that are received from a same input port of the first group of input ports 302 and those sub-beams of the second group of sub-beams that are received from a same input port of the second group of input ports 303.

The first group of sub-beams is redirected from the wavelength-dispersing element 330, via the lensing element 320, to a first actuation array 342 of reflecting elements, heretofore referred to as the second actuation array of reflecting elements, of a first switching stage 346, heretofore referred to as the second switching stage, and the second group of sub-beams is redirected from the wavelength-dispersing element 330, via the lensing element 320, to a second actuation array of reflecting elements 343, heretofore referred to as the third actuation array of reflecting elements, of the first switching stage 346. The first actuation array 342 routes the first group of sub-beams along a first set of paths to a third actuation array 341 of reflecting elements, heretofore referred to as the first actuation array of reflecting elements, of a second switching stage 345, heretofore referred to as the first switching stage. The second actuation array 343 routes the second group of sub-beams along a second set of paths to the third actuation array 341.

The first and second groups of sub-beams are then redirected from the first switching stage 346, via the lensing element 320, to a reflecting relay assembly. Preferably, the reflecting relay assembly includes a first reflecting stage 370, heretofore referred to as the third reflecting stage, a second reflecting stage 360, and a third reflecting stage 350, heretofore referred to as the first reflecting stage. The first group of sub-beams is redirected along the first set of paths from the first actuation array 342, via the lensing element 320, to the first reflecting stage 370, from the first reflecting stage 370, via the lensing element 320, to the second reflecting stage 360, from the second reflecting stage 360, via the lensing element 320, to the third reflecting stage 350, and from the third reflecting stage 350, via the lensing element 320, to the third actuation array 341. The second group of sub-beams is redirected along the second set of paths from the second actuation array 343, via the lensing element 320, to the first reflecting stage 370, from the first reflecting stage 370, via the lensing element 320, to the second reflecting stage 360, from the second reflecting stage 360, via the lensing element 320, to the third reflecting stage 350, and from the third reflecting stage 350, via the lensing element 320, to the third actuation array 341.

The reflecting relay assembly, thereby, redirects the first group of sub-beams along the first set of paths, via the lensing element 320, to the third actuation array 341 and redirects the second group of sub-beams along the second set of paths from the reflecting relay assembly, via the lensing element 320, to the third actuation array 341. The third actuation array 341 of the second switching stage 345 routes each sub-beam of the first and second groups of sub-beams to a same output port 301, heretofore referred to as the input port.

The first and second groups of sub-beams are then redirected from the second switching stage 345, via the lensing element 320, to the wavelength-dispersing element 330, which combines the first and second groups of sub-beams into a multiplexed output beam. The output beam is redirected from the wavelength-dispersing element 330, via the lensing element 320, to the output port 301, which outputs the output beam. In some instances, an output switching lens 311, heretofore referred to as the input switching lens, is disposed before the output port 301 to collimate the output beam.

Of course, numerous other embodiments may be envisaged without departing from the spirit and scope of the invention.

We claim:

1. A wavelength switch comprising:
an input port for launching an input beam including first and second groups of sub-beams, wherein each sub-beam of the first and second groups of sub-beams is at a different wavelength band;
first and second groups of output ports for outputting the first and second groups of sub-beams, respectively;
a lensing element with optical power, disposed to receive the input beam from the input port, for redirecting the input beam and the first and second groups of sub-beams;
a wavelength-dispersing element, disposed to receive the input beam from the lensing element, for dispersing the input beam into the first and second groups of sub-beams;
a first switching stage including a first actuation array of reflecting elements, disposed to receive the first and second groups of sub-beams from the wavelength-dispersing element via the lensing element, for routing the first group of sub-beams along a first set of paths and the second group of sub-beams along a second set of paths;
a reflecting relay assembly, disposed to receive the first and second groups of sub-beams from the first switching stage via the lensing element, for redirecting the first group of sub-beams along the first set of paths and the second group of sub-beams along the second set of paths; and
a second switching stage including: a second actuation array of reflecting elements, disposed to receive only the first group of sub-beams from the reflecting relay assembly, for routing each sub-beam of the first group of sub-beams to a selected output port of the first group of output ports; and a third actuation array of reflecting elements, disposed to receive only the second group of sub-beams from the reflecting relay assembly, for routing each sub-beam of the second group of sub-beams to a selected output port of the second group of output ports;
wherein the wavelength-dispersing element is also disposed to receive the first and second groups of sub-beams from the second switching stage via the lensing element, whereby the wavelength-dispersing element combines those sub-beams of the first group of sub-beams that are routed to a same output port of the first group of output ports and those sub-beams of the second group of sub-beams that are routed to a same output port of the second group of output ports;
wherein the first group of output ports is disposed to receive only the first group of sub-beams from the wavelength-dispersing element via the lensing element; and
wherein the second group of output ports is disposed to receive only the second group of sub-beams from the wavelength-dispersing element via the lensing element.

2. The wavelength switch of claim 1 wherein the reflecting relay assembly includes:
a first reflecting stage, disposed to receive the first and second groups of sub-beams from the first actuation array of reflecting elements via the lensing element, for redirecting the first and second groups of sub-beams;
a second reflecting stage, disposed to receive the first and second groups of sub-beams from the first reflecting stage via the lensing element, for redirecting the first and second groups of sub-beams; and
a third reflecting stage, disposed to receive the first and second groups of sub-beams from the second reflecting stage via the lensing element, for redirecting the first group of sub-beams to the second actuation array of reflecting elements and the second group of sub-beams to the third actuation array of reflecting elements.

3. The wavelength switch of claim 2 wherein the first reflecting stage includes: a first planar mirror, disposed to receive only the first group of sub-beams from the first actuation array of reflecting elements via the lensing element, for redirecting the first group of sub-beams; and a second planar mirror, disposed non-parallel to the first planar mirror to receive only the second group of sub-beams from the first actuation array of reflecting elements via the lensing element, for redirecting the second group of sub-beams;
wherein the second reflecting stage includes: a third planar mirror, disposed to receive only the first group of sub-beams from the first planar mirror via the lensing element, for redirecting the first group of sub-beams; and a fourth planar mirror, disposed non-parallel to the third planar mirror to receive only the second group of sub-beams from the second planar mirror via the lensing element, for redirecting the second group of sub-beams; and
wherein the third reflecting stage includes a fifth planar mirror, disposed to receive the first group of sub-beams from the third planar mirror via the lensing element and the second group of sub-beams from the fourth planar mirror via the lensing element, for redirecting the first group of sub-beams to the second actuation array of reflecting elements and the second group of sub-beams to the third actuation array of reflecting elements.

4. The wavelength switch of claim 3 wherein the first and second planar mirrors are separated by a distance of at least three times a waist radius of the first and second groups of sub-beams to allow hitless switching.

5. The wavelength switch of claim 2 wherein the first reflecting stage includes a first planar mirror, disposed to receive the first and second groups of sub-beams from the first actuation array of reflecting elements via the lensing element, for redirecting the first and second groups of sub-beams;
wherein the second reflecting stage includes a reflecting angle-to-offset (ATO) assembly, disposed to receive the first and second groups of sub-beams from the first planar mirror via the lensing element, for converting angular offsets of the first and second groups of sub-beams into positional offsets and for redirecting the first and second groups of sub-beams; and
wherein the third reflecting stage includes a second planar mirror, disposed to receive the first and second groups of sub-beams from the reflecting ATO assembly via the lensing element, for redirecting the first group of sub-beams to the second actuation array of reflecting elements and the second group of sub-beams to the third actuation array of reflecting elements.

6. The wavelength switch of claim 5 wherein the reflecting ATO assembly includes:
a first ATO lens with negative optical power, disposed to receive the first and second groups of sub-beams from the first planar mirror via the lensing element, for redirecting the first and second groups of sub-beams; and
an ATO mirror, disposed to receive the first and second groups of sub-beams from the first ATO lens, for redirecting the first and second groups of sub-beams back to the first ATO lens.

7. The wavelength switch of claim 6 wherein the ATO mirror has positive optical power;
wherein the optical power of the first ATO lens is twice as large in magnitude as the optical power of the ATO mirror; and
wherein the first ATO lens and the ATO mirror are separated by a distance substantially equivalent to the negative of a focal length of the first ATO lens.

8. The wavelength switch of claim 6 wherein the ATO mirror is planar; and
wherein the first ATO lens and the ATO mirror are separated by a distance substantially equivalent to a focal length of the first ATO lens divided by $-\sqrt{2}$.

9. The wavelength switch of claim 6 wherein the reflecting ATO assembly further includes a beam-reducing assembly, disposed to receive the first and second groups of sub-beams from the first planar mirror, for reducing the first and second groups of sub-beams in waist size and for redirecting the first and second groups of sub-beams to the first ATO lens.

10. The wavelength switch of claim 9 wherein the beam-reducing assembly includes a second ATO lens with positive optical power, disposed to receive the first and second groups of sub-beams from the first planar mirror, for redirecting the first and second groups of sub-beams.

11. The wavelength switch of claim 10 wherein the beam-reducing assembly further includes a third ATO lens with positive optical power, disposed to receive the first and second groups of sub-beams from the second ATO lens, for redirecting the first and second groups of sub-beams to the first ATO lens;
wherein a ratio of a separation between the second ATO lens and the ATO mirror and a separation between the third ATO lens and the ATO mirror is substantially equivalent to a ratio of a focal length of the second ATO lens to a focal length of the third ATO lens; and
wherein the second and third ATO lenses are separated by a distance substantially equivalent to a sum of the focal length of the second ATO lens and the focal length of the third ATO lens.

12. The wavelength switch of claim 1 wherein the lensing element includes a spherical mirror with positive optical power.

13. The wavelength switch of claim 1 wherein the wavelength-dispersing element includes a reflecting diffraction grating.

14. The wavelength switch of claim 1 wherein the wavelength-dispersing element includes: a transmitting diffraction grating, disposed to receive the input beam from the lensing element, for dispersing the input beam into the first and second groups of sub-beams; and a mirror, disposed to receive the first and second groups of sub-beams from the transmitting diffraction grating, for redirecting the first and second groups of sub-beams back to the transmitting diffraction grating.

15. The wavelength switch of claim 1 further comprising a front-end unit, wherein the input port and the first and second groups of output ports are disposed in the front-end unit.

16. The wavelength switch of claim 1 further comprising a back-end unit, wherein the first, second, and third actuation arrays of reflecting elements are disposed in the back-end unit.

17. The wavelength switch of claim 1 wherein the first, second, and third actuation arrays of reflecting elements are disposed on a single substrate.

18. The wavelength switch of claim 17 wherein the second and third actuation arrays of reflecting elements share common control lines.

19. The wavelength switch of claim 1 wherein the first, second, and third actuation arrays of reflecting elements include microelectromechanical system (MEMS) mirror arrays.

20. The wavelength switch of claim 1 wherein the first, second, and third actuation arrays of reflecting elements include liquid crystal on silicon (LCOS) arrays.

21. The wavelength switch of claim 1 wherein the second and third actuation arrays of reflecting elements are separated by a distance of at least three times a waist radius of the first and second groups of sub-beams to allow hitless switching.

22. The wavelength switch of claim 1 further including:
an input switching lens with positive optical power, disposed to receive the input beam from the input port, for collimating the input beam;
a first output switching lens with positive optical power, disposed to receive only the first group of sub-beams from the wavelength-dispersing element via the lensing element, for converting angular offsets of the first group of sub-beams into positional offsets and for redirecting each sub-beam of the first group of sub-beams to the selected output port of the first group of output ports; and
a second output switching lens with positive optical power, disposed to receive only the second group of sub-beams from the wavelength-dispersing element via the lensing element, for converting angular offsets of the second group of sub-beams into positional offsets and for redirecting each sub-beam of the second group of sub-beams to the selected output port of the second group of output ports.

23. A wavelength-switching method comprising:
launching an input beam including first and second groups of sub-beams from an input port towards a lensing element with optical power, wherein each sub-beam of the first and second groups of sub-beams is at a different wavelength band;
redirecting the input beam from the lensing element to a wavelength-dispersing element;
dispersing the input beam into the first and second groups of sub-beams;
redirecting the first and second groups of sub-beams from the wavelength-dispersing element to a first actuation array of reflecting elements of a first switching stage via the lensing element;
routing the first group of sub-beams along a first set of paths to a second actuation array of reflecting elements of a second switching stage;
routing the second group of sub-beams along a second set of paths to a third actuation array of reflecting elements of the second switching stage;
redirecting the first and second groups of sub-beams from the first switching stage to a reflecting relay assembly via the lensing element;

redirecting only the first group of sub-beams along the first set of paths from the reflecting relay assembly to the second actuation array of reflecting elements of the second switching stage via the lensing element;
redirecting only the second group of sub-beams along the second set of paths from the reflecting relay assembly to the third actuation array of reflecting elements of the second switching stage via the lensing element;
routing each sub-beam of the first group of sub-beams to a selected output port of a first group of output ports;
routing each sub-beam of the second group of sub-beams to a selected output port of a second group of output ports;
redirecting the first and second groups of sub-beams from the second switching stage to the wavelength-dispersing element via the lensing element;
combining those sub-beams of the first group of sub-beams that are routed to a same output port of the first group of output ports;
combining those sub-beams of the second group of sub-beams that are routed to a same output port of the second group of output ports;
redirecting only the first group of sub-beams from the wavelength-dispersing element to the first group of output ports via the lensing element;
redirecting only the second group of sub-beams from the wavelength-dispersing element to the second group of output ports via the lensing element; and
outputting the first and second groups of sub-beams from the first and second groups of output ports, respectively.

24. A wavelength switch comprising:
first and second groups of input ports for launching first and second groups of sub-beams, respectively, wherein each sub-beam of the first and second groups of sub-beams is at a different wavelength band;
an output port for outputting an output beam including the first and second groups of sub-beams;
a lensing element with optical power, disposed to receive only the first group of sub-beams from the first group of input ports and only the second group of sub-beams from the second group of input ports, for redirecting the first and second groups of sub-beams and the output beam;
a wavelength-dispersing element, disposed to receive the first and second groups of sub-beams from the lensing element, for dispersing those sub-beams of the first group of sub-beams that are received from a same input port of the first group of input ports via the lensing element and those sub-beams of the second group of sub-beams that are received from a same input port of the second group of input ports via the lensing element;
a first switching stage including: a first actuation array of reflecting elements, disposed to receive only the first group of sub-beams from the wavelength-dispersing element via the lensing element, for routing the first group of sub-beams along a first set of paths; and a second actuation array of reflecting elements, disposed to receive only the second group of sub-beams from the wavelength-dispersing element via the lensing element, for routing the second group of sub-beams along a second set of paths;
a reflecting relay assembly, disposed to receive the first and second groups of sub-beams from the first switching stage via the lensing element, for redirecting the first group of sub-beams along the first set of paths and the second group of sub-beams along the second set of paths; and
a second switching stage including a third actuation array of reflecting elements, disposed to receive the first and second groups of sub-beams from the reflecting relay assembly, for routing each sub-beam of the first and second groups of sub-beams to the output port;
wherein the wavelength-dispersing element is also disposed to receive the first and second groups of sub-beams from the second switching stage via the lensing element, whereby the wavelength-dispersing element combines the first and second groups of sub-beams into the output beam; and
wherein the output port is disposed to receive the output beam from the wavelength-dispersing element via the lensing element.

25. A wavelength-switching method comprising:
launching first and second groups of sub-beams from first and second groups of input ports, respectively, towards a lensing element with optical power, wherein each sub-beam of the first and second groups of sub-beams is at a different wavelength band;
redirecting the first and second groups of sub-beams from the lensing element to a wavelength-dispersing element;
dispersing those sub-beams of the first group of sub-beams that are received from a same input port of the first group of input ports via the lensing element and those sub-beams of the second group of sub-beams that are received from a same input port of the second group of input ports via the lensing element;
redirecting only the first group of sub-beams from the wavelength-dispersing element to a first actuation array of reflecting elements of a first switching stage via the lensing element;
redirecting only the second group of sub-beams from the wavelength-dispersing element to a second actuation array of reflecting elements of the first switching stage via the lensing element;
routing the first group of sub-beams along a first set of paths to a third actuation array of reflecting elements of a second switching stage;
routing the second group of sub-beams along a second set of paths to the third actuation array of reflecting elements of the second switching stage;
redirecting the first and second groups of sub-beams from the first switching stage to a reflecting relay assembly via the lensing element;
redirecting only the first group of sub-beams along the first set of paths from the reflecting relay assembly to the third actuation array of reflecting elements of the second switching stage via the lensing element;
redirecting only the second group of sub-beams along the second set of paths from the reflecting relay assembly to the third actuation array of reflecting elements of the second switching stage via the lensing element;
routing each sub-beam of the first and second groups of sub-beams to a same output port;
redirecting the first and second groups of sub-beams from the second switching stage to the wavelength-dispersing element via the lensing element;
combining the first and second groups of sub-beams into an output beam;
redirecting the output beam from the wavelength-dispersing element to the output port via the lensing element; and
outputting the output beam from the output port.

* * * * *